(No Model.)
W. B. MELICK.
CLINOMETER.
No. 416,683. Patented Dec. 3, 1889.
Fig. I.
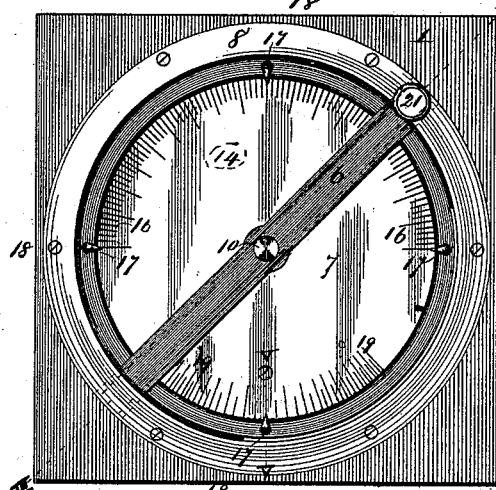
Fig. II.
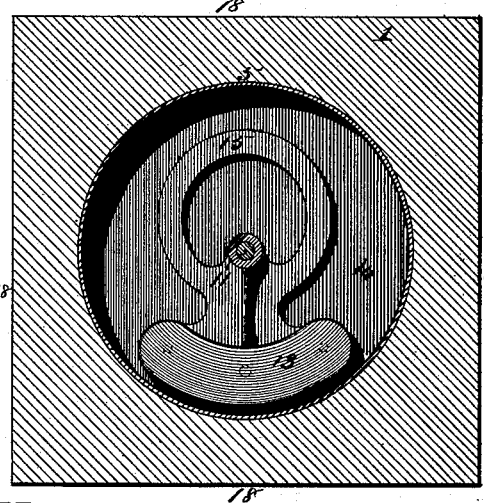
Fig. VI.
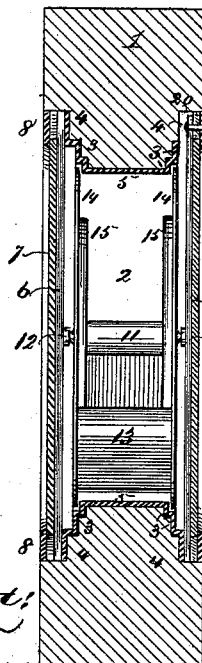
Fig. III.
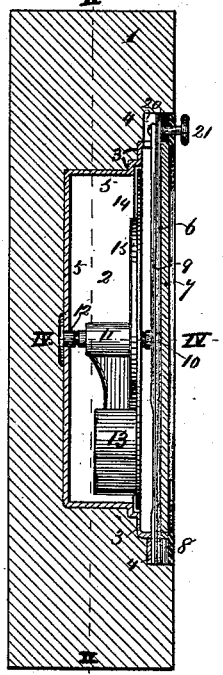
Fig. V.
Fig. IV.
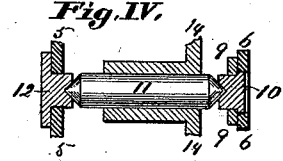
Attest:
E. Arthur
Geo. E. ——
Inventor:
William B. Melick
By Knight Bro.
Atty.
N. PETERS, Photo-Lithographer, Washington, D. C.

UNITED STATES PATENT OFFICE.

WILLIAM B. MELICK, OF ST. LOUIS, MISSOURI, ASSIGNOR OF ONE-THIRD TO ANDREW LESLIE, OF SAME PLACE.

CLINOMETER.

SPECIFICATION forming part of Letters Patent No. 416,683, dated December 3, 1889.

Application filed June 19, 1889. Serial No. 314,839. (No model.)

*To all whom it may concern:*

Be it known that I, WILLIAM B. MELICK, of the city of St. Louis, in the State of Missouri, have invented a certain new and useful Improvement in Clinometers, of which the following is a full, clear, and exact description, reference being had to the accompanying drawings, forming part of this specification.

Figure I is a front view. Fig. II is a longitudinal vertical section at II II, Fig. III. Fig. III is an oblique transverse section at III III, Fig. I. Fig. IV is an enlarged detail section at IV IV, Fig. III. Fig. V is a detail section at V V, Fig. I. Fig. VI is an axial section showing the instrument made with a face upon each side.

My invention consists in features of novelty hereinafter described, and pointed out in the claims.

I will first describe the device as shown in Figs. I to V, inclusive.

The case or box may properly be made of a square block 1, of wood, with a circular recess 2 made in the front side of the same. This recess is made with annular steps or grooves 3 and 4, and is shown lined with metal 5.

6 is a cross-bar stretched diagonally across the recess and fastened at both ends.

7 is a glass face over the cross-bar, held in place by a ring or bezel 8.

9 is a spring-plate underneath the cross-bar, to which is attached one of the arbor-bearings 10, said bearing having a conical recess to receive a conical end of the arbor 11. The arbor-bearing 10 has a cylindrical end having free bearing in a hole made through the middle of the cross-bar, so as to give the bearing steady support. The other conical end of the arbor turns in a bearing 12, secured in the case at the rear side of the recess. To the arbor is fastened the weighted arm or pendulum 13, to which is attached the circular scale plate or disk 14, whose periphery is concentric with the arbor.

15 is a curved bar serving to stiffen the scale plate or disk, which is soldered or otherwise fastened to the arbor 11 and pendulum. The scale plate or disk has an inclination-scale 16 extending half a circle or one hundred and eighty degrees, being marked "Zero" at its center and running to ninety degree in each direction.

17 are pointers set opposite to the middle of each side 18 of the case, so that when the sides are vertical and horizontal there is always a point at zero, and any deviation from this in a vertical plane is indicated in degrees on the scale 16.

The grading-scale 19 is so divided as to indicate the rise in a given horizonal distance. Thus the inclination may be at all times read, either in degrees or as to inclination of grade.

One end of the spring-plate 9 is in a recess 20 beneath the ring 8, and upon this free end of the spring-plate is attached a knob 21, by which the free end of the spring-plate may be pressed inward to bind the arbor 11 in its bearings to a slight degree, so as to check the oscillation of the pendulum and bring it to rest more speedily.

It will be seen that the use of the four pointers just ninety degrees from each other enables the use of either side of the instrument either as a level or as a plumb, and also one or more of the pointers will always be in a proper position for observation whatever the position of the eye of the user.

The distances upon the scale 19 are not equal throughout the length of the scale, but decrease in distance outwardly from the center of the scale, for the movement of the disk one degree would indicate a greater change of grade as the inclination of the grade increases.

In the modification shown in Fig. VI the opening 2 extends through the block, and the disk 14, cross-bar 6, glass 7, and pointers 17 are duplicated, so that the indicator may be read from either side. The spring-plate 9 is not duplicated, and the bearing 12 is secured to the cross-bar 6. In this modification, also, the arbor 10 is attached firmly to the cross-bar 6, and said bar is made to act as a spring-plate and to take the place of the spring-plate 9, one end having a limited inward and outward movement and being attached to the knob 21, by pressure upon which the inward movement is given to the free end, as described relative to spring-plate 9.

I claim as my invention—

1. A clinometer comprising a case 1, having an arbor-bearing 12, the spring-plate having an arbor-bearing 10 and a push-knob 21, the arbor 11, and the eccentrically-weighted circular plate having a scale, substantially as described.

2. A clinometer comprising a case 1, having an arbor-bearing 12, the spring-plate having an arbor-bearing 10 and a push-knob 21, the arbor 11, the pointers 17, and the eccentrically-weighted circular plate having a scale on the face thereof, substantially as described.

3. A clinometer comprising a case 1, having an arbor-bearing 12, the spring-plate having an arbor-bearing 10 and a push-knob 21, the arbor 11, the pointers 17, and the eccentrically-weighted circular plate 14, having an inclination-scale 16 and a grading-scale 19 on the face thereof and mounted on the arbor, substantially as described.

4. A clinometer comprising a case 1, having a bearing 12, the bar 6, the spring-plate 9, having the bearing 10 and push-knob 21, the arbor 11, and the eccentrically-weighted circular plate 14, having a scale on the face thereof and mounted on the arbor, substantially as described.

5. A clinometer comprising a square case 1, having a circular recess 2, formed with annular steps 3 4, the lining 5, the bearing 12, the diagonal bar 6, the spring-plate 9, having the bearing 10 and the push-knob 21, the arbor 11, the eccentrically-weighted circular plate 14, having an inclination-scale 16 and a grading-scale 19, and the pointers 17, substantially as described.

WILLIAM B. MELICK.

Witnesses:
SAML. KNIGHT,
BENJN. A. KNIGHT.